US005141070A

United States Patent [19]

Hickmann et al.

[11] Patent Number: 5,141,070

[45] Date of Patent: Aug. 25, 1992

[54] ENGINE LOADING DEVICE WITH ELECTRIC AND MECHANICAL CONTROL OF A THROTTLE VALVE

[75] Inventors: Gerd Hickmann, Schwalbach/Ts.; Manfred Pfalzgraf, Frankfurt am Main; Milan Hrusovsky, Oberursel; Peter Volz, Frankfurt am Main, all of Fed. Rep. of Germany

[73] Assignee: VDO Adolf Schindling AG, Frankfurt an Main, Fed. Rep. of Germany

[21] Appl. No.: 622,134

[22] Filed: Dec. 4, 1990

Related U.S. Application Data

[63] Continuation of Ser. No. 327,519, Mar. 21, 1989, abandoned.

[30] Foreign Application Priority Data

May 7, 1988 [DE] Fed. Rep. of Germany ....... 3815735

[51] Int. Cl.⁵ ........................ B60K 28/16; F02D 9/02; F02D 11/10

[52] U.S. Cl. .................................... 180/197; 123/396

[58] Field of Search ................ 180/197, 279; 123/396, 123/399, 361, 403

[56] References Cited

U.S. PATENT DOCUMENTS

| | | | |
|---|---|---|---|
| 3,982,509 | 9/1976 | Colling et al. | 180/197 X |
| 4,722,411 | 2/1988 | Ohashi et al. | 180/197 |
| 4,848,505 | 7/1989 | Yoshizawa et al. | 180/197 |

*Primary Examiner*—Mitchell J. Hill

*Attorney, Agent, or Firm*—Martin A. Farber

[57] ABSTRACT

A load-adjustment device having a control element which can act on a throttle valve (e.g.) of an internal combustion engine and which is connected to a driver which is coupled to an accelerator pedal and, in addition, can be moved by means of an electric setting drive, having a desired-value-detection element associated with the driver and an actual-value detection element which cooperates with the desired-value detection element and acts on the electric setting drive, the electric setting drive being controllable as a function of the detected values of an electronic control device. The driver, the control element, the desired-value detection element, the actual-value detection element and the setting drive are arranged in the throttle-valve housing, the driver and the control element being coupled by means of a coupling spring and the control element being urged in the direction towards a stop of the driver.

19 Claims, 5 Drawing Sheets

ENGINE LOADING DEVICE WITH ELECTRIC AND MECHANICAL CONTROL OF A THROTTLE VALVE

This application is a continuation of our co-pending application Ser. No. 07/327,519 filed Mar. 21, 1989 now abandoned.

FIELD AND BACKGROUND OF THE INVENTION

The invention relates to a load-adjustment device having a control element (11) which can act on a throttle valve (e.g. 16) of an internal combustion engine, and which is connected to a driver (4) which is coupled to an accelerator pedal (1) and, in addition, can be moved by means of an electric setting drive (9), having a desired-value detection element (7) associated with the driver and an actual-value detection element (12) which cooperates with the desired-value detection element (7) and acts on the electric setting drive, the electric setting drive being controllable as a function of the detected values of an electronic control device (22).

Load-adjustment devices of this kind are provided for the actuation of the throttle valve by the accelerator pedal so as to be able so to intervene by means of the electronic control device that, for instance, wheel slippage resulting from excessive power upon starting is avoided. The control device provides that upon excessively rapid depression of the accelerator pedal, the throttle valve, for instance, is opened less than corresponds to the position of the accelerator pedal, so that the internal combustion engine produces only an amount of power which does not lead to spinning of the wheels. Other automatic interventions into the load-adjustment device are necessary if a transmission is to be shifted automatically or the engine idling speed of rotation is to be set to a value which is constant even when different powers are required upon idling. It is also known in the case of such an adjustment device to intervene by a speed-limiting controller which can provide, by the possibility of uncoupling the control element from the accelerator pedal, that in each case that power is set which is necessary in order to maintain the speed set. In addition, it may be desirable, particularly from the standpoint of comfort in driving, to provide a progressive or degressive connection of the accelerator pedal, with the possibility of reduced or increased power setting as compared with the position of the accelerator pedal.

Safety factors, however, make it necessary to provide assurance, even in the event of a defect in the control device, that upon retraction of the position of the accelerator pedal, the power setting decreases synchronously with the position of the accelerator pedal. This is achieved by safety devices in the electronic control device. Possibilities of error in the control device are reduced in the manner that the electronic system is developed redundantly. Nevertheless, too high a power setting which does not correspond to the position of the accelerator pedal is not completely excluded in the event that a defect is present.

Load-adjustment devices of the foregoing type are generally developed with several parts, i.e. given elements are associated with the accelerator perdal while other elements cooperate with the control element. Such a separate arrangement of the parts means, on the one hand, an increased structural size of the load-adjustment device while, on the other hand, due to the arrangement of the parts at different places of the vehicle, there is no assurance that the parts cooperate with the throttle valve without reaction.

SUMMARY OF THE INVENTION

It is an object of the invention to develop a load-adjustment device of the aforementioned type in such a way that it is compact and permits a well-defined reaction on the throttle valve under all conditions of load, and particularly in the event of the failure of the electronic control device.

According to the invention, the driver (4), the control element (11), the desired-value detection element (the wiper 7 of a potentiometer) the actual-value detection element (the wiper 12 of a potentiometer) and the setting drive (9) are arranged in the throttle-valve housing (24), the driver (4) and the control element (11) being coupled by means of a coupling spring (13) and the control element (11) being urged in the direction towards a stop (14) of the driver (4).

By the arrangement of driver, coupling spring, control element, desired-value detection element and actual-value detection element in the direct functional chain, assurance is had that control processes between the parts can take place in the smallest possible space, while by the arrangement of the parts within the throttle-valve housing, assurance is also had that the functional chain acts directly within the region of the internal combustion engine. Thus, for instance, the accelerator pedal can act via a Bowden cable directly on the driver which is arranged in the region of the throttle valve and urged by a further spring into the idling direction, the position of the driver being represented by the desired-value detection element and the position of the control element by the actual-value detection element, and the values detected by the two elements are transmitted to an electronic control device which, via the electric setting drive which is also arranged in the immediate vicinity of the throttle valve, controls the control element cooperating with the throttle valve in accordance with the regulating characteristic established between the two elements. The coupling spring, in this case, provides assurance that in the event of diverging movements of driver and control element, a failure of the electronic control device will always lead to a change of the power setting to a power value which corresponds to the position of the accelerator pedal.

In accordance with one particular embodiment of the invention, the control element (11) is formed by a mounting shaft (16*a*) of the throttle valve (16) and by a control lever (21) which is connected, fixed for rotation, with one end (16*a*') of the mounting shaft (16*a*). The possibility is thus provided of having the coupling spring act on the one side on the driver and on the other side on the mounting shaft, the control lever then cooperating with the stop of the driver.

The load-adjustment device is of particularly simple construction in the region of the throttle-valve housing if one end (16*a*') of the mounting shaft (16*a*) of the throttle valve (16) is connected in force-locked manner to the driver (4) and the other end (16*a*") of the mounting shaft (16*a*) is connected by an electromagnetically operating clutch (10) to the setting drive, which is developed as an electric motor (9).

The regulation of the load can thus act on the throttle valve on the one hand, via the accelerator pedal and the one end of the mounting shaft associated with it and, on the other hand, via the electric motor and the other end of the mounting shaft. A reduction gearing (49, 50, 51, 52) may be arranged between the electric motor (9) and the clutch (10) so that minimum angles of swing can be produced upon actuation of the electric motor, this leading to optimal quality of control.

In addition, it is advantageous if the driver (4) is rotatably mounted in the throttle-valve housing (24) concentric to the mounting shaft of the throttle valve (16) and furthermore minimum construction depth of the throttle-valve housing is obtained if the coupling spring is developed as a coil spring and particularly as a flat spiral spring (13) which passes, for instance, through the driver which is developed as a bell, and if said spring is connected at one end (45) to the driver (4) and at the other end (46) to the facing end (16a') of the mounting shaft (16a).

The load-adjustment device of the invention can operate, for instance, with a potentiometer but in such case the desired-value detection element (7) is developed as a first wiper (7), connected to the driver (4), of a default-and return-report-potentiometer (8) having two wipers (7, 12) the actual-value detection element (12) of which in the form of the second wiper (12) is connected to the control element (21), the distance between the wipers (7, 12) being monitored by means of an electronic control device (22).

In accordance with a particular embodiment of the invention, the driver (4) is developed in two parts, with a first part (4a) which is coupled with the accelerator pedal (1) and associated with the desired-value detection element (7) and a second part (46) which is movable relative to the first part (4a) and has the stop (14) which is associated with the control lever (21), the second part (4b) being connected by the coupling spring (13) to the control element (11). By this bipartite development there is possible an independent movement of the first part associated with the desired-value detection element with respect to the second part associated with the control element and thus an upward regulating function, in which connection the distance-monitoring device possibly provided is deactivated upon the upward regulation and the second part of the driver is shifted, via the control element against the force of the further spring, relative to the first part of the driver which is coupled to the accelerator pedal, and this spring provides that upon failure of the electronic control device the driver and the control element are guided, geometrically defined, with respect to each other.

According to a feature of the invention, a further spring (6) urges the driver (4) in the idling direction. Also, according to another feature, the further spring (6) acts on the second part (4b) of the driver (4).

It would be conceivable that a situation might arise wherein, despite the disconnecting of the electric setting drive, the coupling spring which urges the driver in idling direction, and also the further spring are not able, due to a jamming of structural parts, to move the driver in the idling direction. Such a defect can be noted, in simple manner, by providing the accelerator pedal (1) with a pedal contact switch (18) by which the exertion of force by the driver on the accelerator pedal can be noted.

In the load-adjustment device of the invention it is of particular importance that all elements of the load-adjustment device which act via an electronic circuit on the control element are deactivated upon failure of the electrical system, so that the load-adjustment device operates mechanically via the coupling of driver and control element by means of the coupling spring. Thus it is provided that the electronic control device (22) is disconnected when the load-adjustment device is in voltage-free state. The same applies to the electric setting drive (9), the associated clutch (10) of which is to be opened in voltage-free or non-controlled condition of the electric setting drive (9). In principle, however, it is not necessary for a clutch to be provided; in the event of a direct coupling of the electric setting drive to the control element it would then be necessary, however, in the event of failure of the electronic control device that the further spring be so amply dimensioned that it can move the electric setting drive, in which way however reactions on the driver and the accelerator pedal cannot, be completely excluded.

In accordance with a particular embodiment of the invention, it is provided that the electric setting drive (9) can be controlled as a function of one or more additional control variables. One additional control variable can, for instance, be the speed of rotation of the engine, particularly the idling speed of rotation.

In addition, there are of particular importance control variables which refer to barometric pressure, cold start and thus the temperature of the engine, the gear position and thus the state of load of the vehicle and the push drive and thus indirectly the speed of the vehicle, and, furthermore, control variables can also result from the default value of the speed controller, the anti-slip regulation and thus the detection of the speed of rotation of the wheel as well as the adjustment of the engine drag moment.

It is of particular importance for the present invention that between the stop (14) and the control element (21), in particular the control lever (21), there is provided a distance monitoring device (15) which, upon the negative exceeding of a predetermined distance away of the electronic control device (22), feeds a signal for the purpose of plausibility testing. For this purpose, the electronic control device (22) can disconnect the electric setting motor upon the presence of a signal and defined plausibility conditions, insofar as the motor is connected by a clutch to the control element or, if this is not the case, disconnected directly. The distance monitoring device (15) should in this connection, upon the dropping below of a predetermined distance, open a safety contact (17) which removes current from the clutch (10) and thereby opens it. The safety contact (17) preferably has a bridging line with a switch which opens and closes upon the presence of additional control variables. By the distance monitoring device there is created an additional redundance which is independent of the electronic control device and operates substantially mechanically, so that particularly high assurance against an undesired power setting is provided. The distance monitoring device is placed out of operation if, contrary to the desire of the driver, an upward regulating load function is to be produced and if in this upward-regulated load condition it can only be activated again if the electronic control device should fail, as a result of which the load level is again adapted, via the coupling spring, to the level determined by the accelerator pedal.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
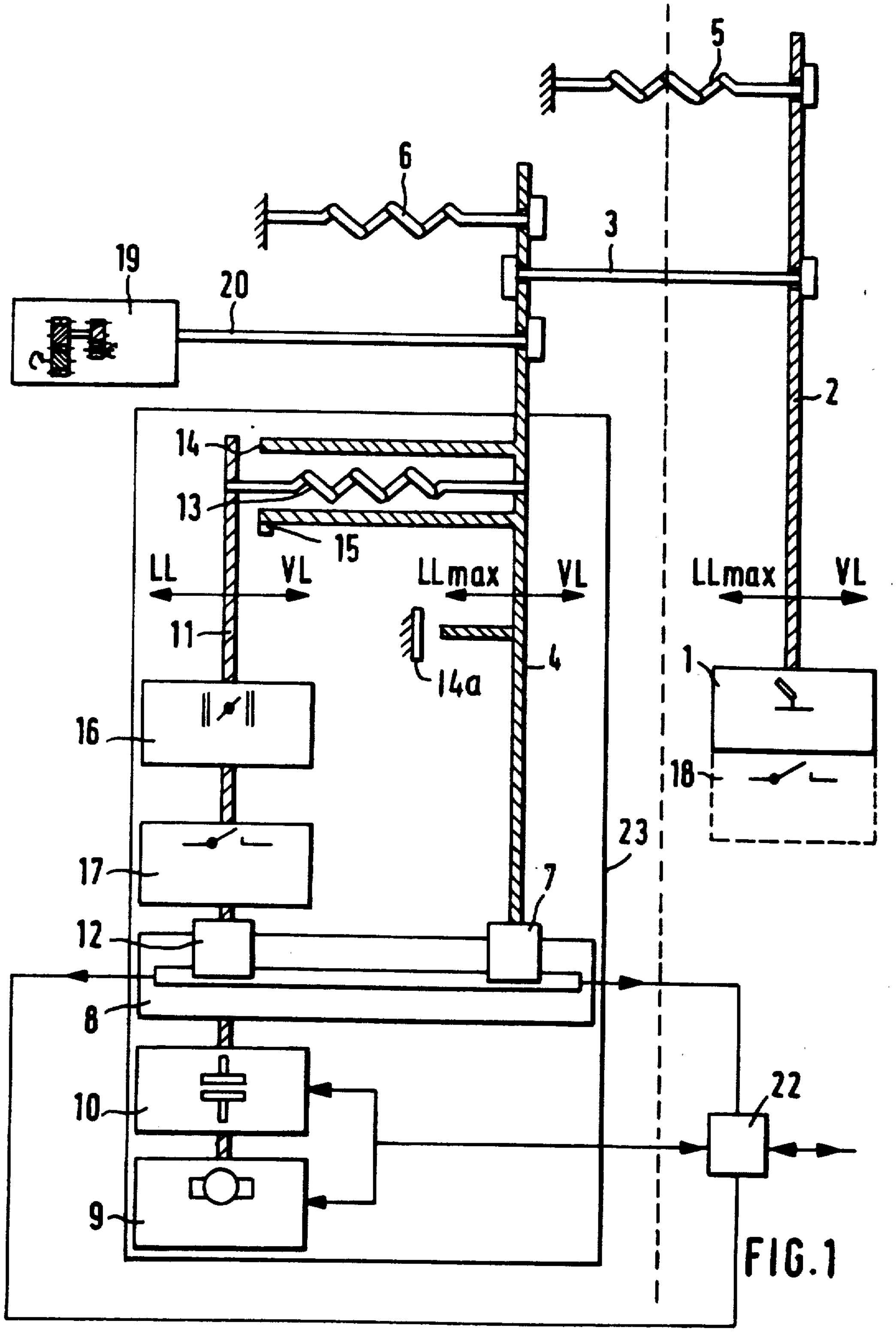
FIG. 1 is a block diagram serving to explain the basic principle of the first embodiment of the invention with a unipartite driver.

FIG. 1 shows an accelerator pedal 1 by which a lever 2 can be displaced between a full-load position VL and an idling position with maximum idling power LLmax. Via a rod 3, the lever 2 can displace a unipartite driver 4 in the direction of full load VL and is urged into idling direction by a return spring 5 which acts on the lever 2. A return spring 6 urges the driver 4 in the idling direction. The driver 4 is connected to a desired-value detection element in the form of a wiper 7 of a potentiometer 8 which controls a setting motor 9 which is capable of shifting a control element 11 via a clutch 10. The control element 11 serves directly for adjusting a throttle-valve 16. The position of the control element 11 is transmitted via an actual-value detection element in the manner of a second wiper 12, firmly connected to it, to the potentiometer 8. If the control element 11 follows precisely the command of the accelerator pedal 1 then the distance between the wipers 7 and 12 must remain constant.

Electronic control device 22, which, inter alia, controls the electric setting motor 9 and the clutch 10, cooperates with the wipers 7 and 12 of the potentiometer 8. Due to the possibility of representing external default values by the control device 22, the control element 11 can be moved independently of the driver 4.

In the event of a failure of the electronic system, a mechanical connection is provided between the driver 4 and the control element 11 by means of a coupling spring 13 which urges the control element 11 in the direction towards a stop 14 of the driver 4. The distance between the stop 14 and the control element 11 is indicated in exaggerated amount in FIG. 1, and when the load-adjustment device is operating properly it is slight and is monitored by a distance-monitoring device 15, which may be a simple limit switch. If the electronic system fails, then the driver 4, after overcoming the slight distance between stop 14 and control element 11, can shift the latter into the idling position.

The frame 23 shown in FIG. 1 is intended to make it clear that the driver 4, the coupling spring 13, the control element 11 as well as the potentiometer 8 with the two wipers 7 and 12 represent a structural unit, and the throttle-valve 16, the electric setting motor 9 and the clutch 10 arranged within the frame 23 show, in addition, that said parts at the same time form a single structural unit with the throttle-valve housing.

Finally, in the variant shown in FIG. 1 there is of importance the provision of a safety contact 17 which cooperates with the clutch 10. Thus, a slight reduction in distance is already an indication that the throttle-valve 16 has opened further than corresponds to what the driver of the vehicle has established. This fact is detected by the distance monitoring device 15 and causes the safety contact 17 to open, which leads to the release of the clutch 10. If on the other hand, contrary to the desire of the driver, an upward-regulating load function is tended towards, then a deactivation of the distance-monitoring device 15 takes place so that the control element 11 can drive the driver 4 in the direction of full load without the safety contact 17 opening.

For the event that after the release of the accelerator pedal 1 the driver 4 and the control element 11 cannot be pushed in the idling direction, a pedal contact switch 18 is provided on the accelerator pedal 1 and serves to note such an error condition. Also shown in FIG. 1 is a fixed stop 14*a* which serves to limit movement of the driver 4 when it has reached the position $LL_{max}$. Further closing of the throttle-valve 16 can only be performed by the electric setting device 9, 10.

For the sake of completeness, there has been shown in FIG. 1 an automatic transmission 19 in connection with which an automatic pull 20 can be displaced via the driver 4.

Figure 2:
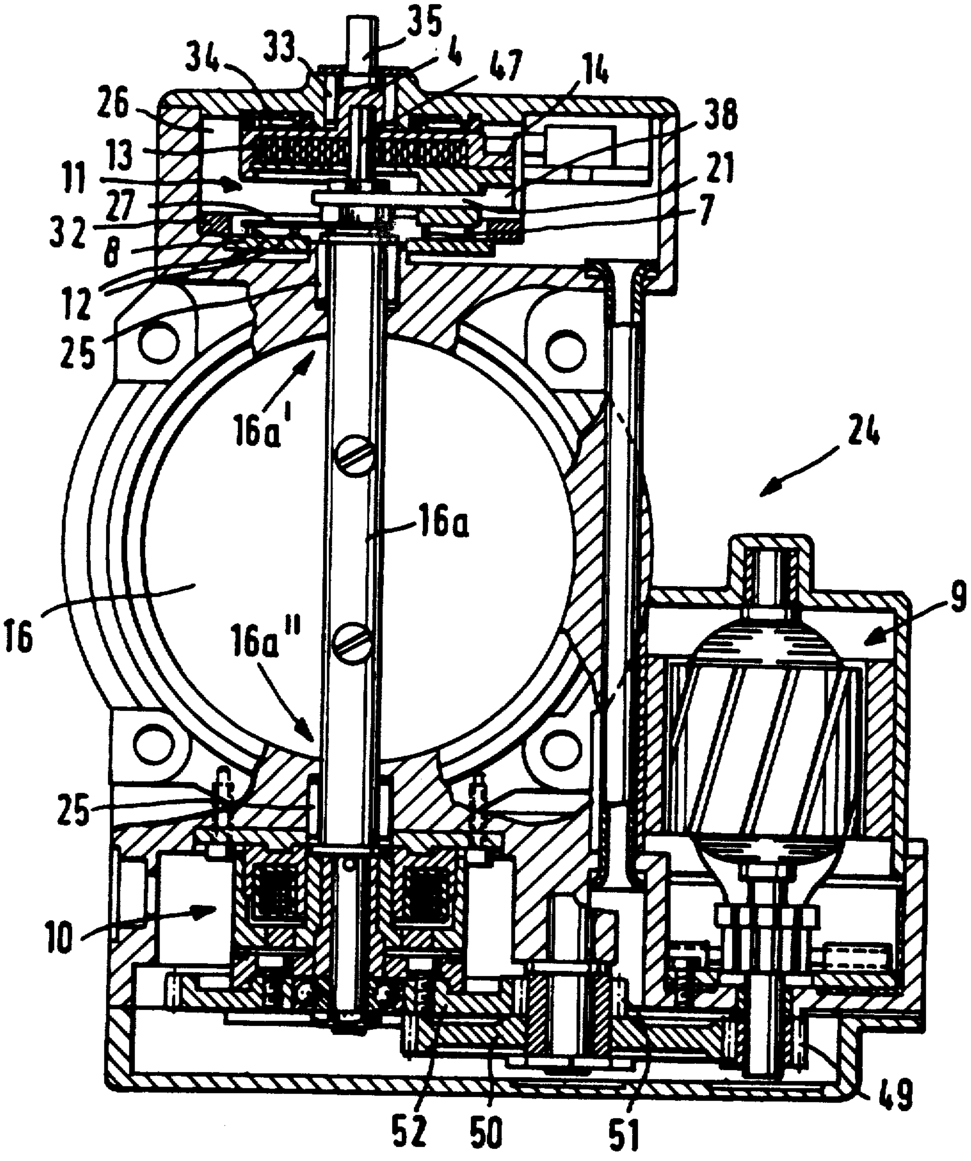
FIG. 2 is a longitudinal section through the throttle-valve housing of the load-adjustment device which operates in accordance with the above-mentioned principle.
Figure 3:
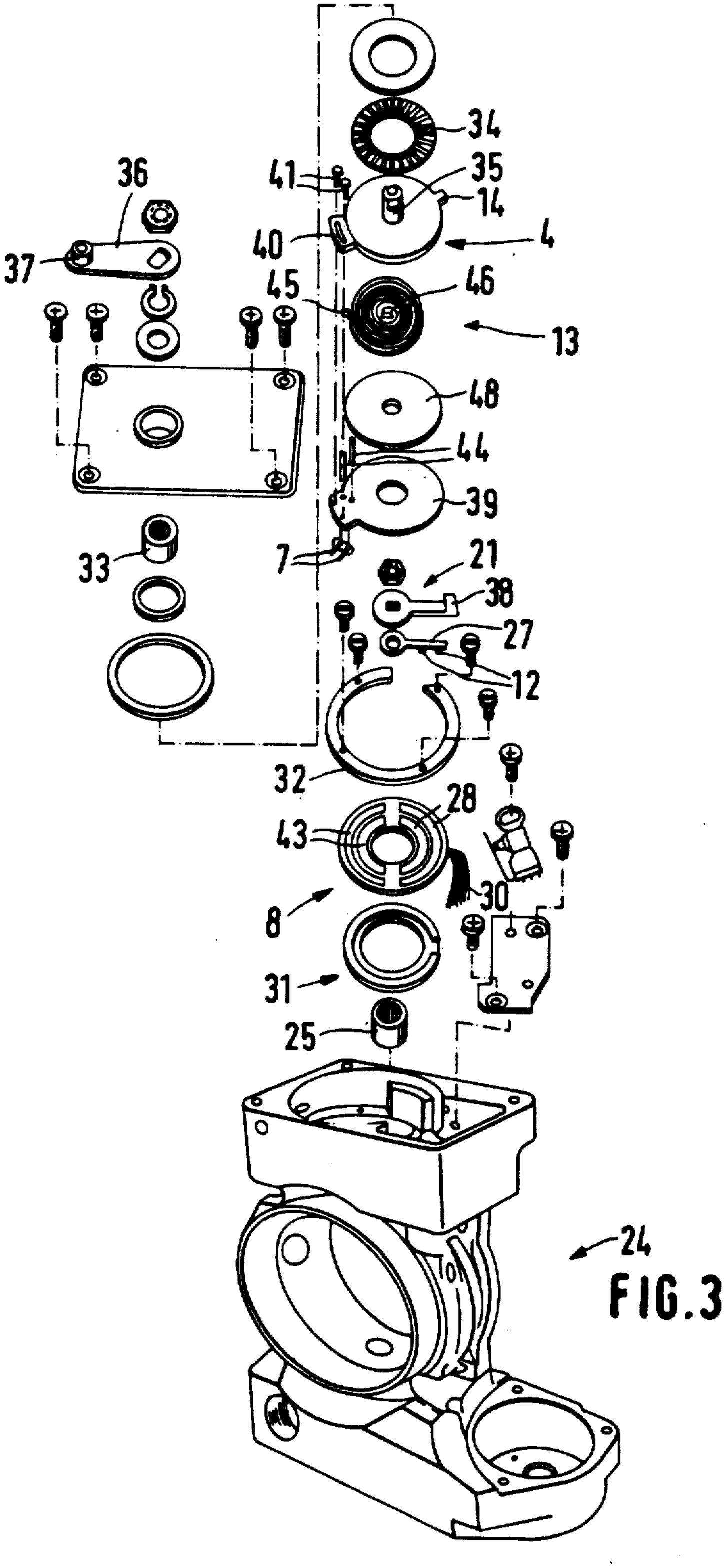
FIG. 3 is a perspective view of the throttle-valve housing with the parts arranged in the region of the driver-side end of the throttle-valve housing being shown in an exploded view.

FIGS. 2 and 3 show the throttle-valve housing 24 within which a mounting shaft 16*a* for the throttle-valve 16 is mounted, the throttle-vavle housing 24 receiving, in the region of the end 16*a*' of the mounting shaft 16, the driver 4, the coupling spring 13 which is connected at one end in form-locked manner with it, which coupling spring is simultaneously connected in form-locked manner at the other end to the mounting shaft 16*a*, as well as the control lever 21 which is connected in form-locked manner to the mounting shaft 16*a* and forms a part of the control element 11. Also shown are the wipers 7 and 12 and the potentiometer 8 and, furthermore, in the region of the end 16*a*" of the mounting shaft 16*a*, the electric setting motor 9 and the electromagnetically acting clutch 10, as well as a reduction gearing arranged between them. For reasons of clarity in the drawing details with regard to the control electronics 22, the distance-monitoring device 15 and the safety contact 17 of FIG. 1 have not been shown in FIGS. 2 and 3.

In detail, FIGS. 2 and 3 show two needle bearings 25 for the mounting shaft 16*a* to which the throttle-valve 16 is secured. The free end 16*a*' of the mounting shaft 16*a* passes through a mounting opening 26 in the throttle-valve housing 24 and receives there, fixed in rotation, the control lever 21 having a stop 38. A wiper arm 27 is also fastened, fixed in rotation, to this end 16*a*' of the mounting shaft 16*a*, the wiper 12 of said arm lying on wiper paths 28 of a potentiometer board 8 which are associated with it, the potentiometer board 8 being provided with cable leads 30 and resting on a cable protection ring 31 lying against the throttle-valve housing 24. A holding ring 32 screwed onto the throttle-valve housing 24 in this connection fixes the potentiometer board 8 in well-defined position.

A mounting hole in the throttle-valve housing 24 and the housing wall adjoining said hole receive needle bearings 33 and 34 in which the driver 4 is radially and axially supported. The driver is developed as a flat plate and has at the outside a hollow pin 35 which is arranged concentrically to the center axis of the shaft 16*a* and is connected, fixed in rotation, with a lever 36 having a connecting nipple 37 and, via it, to the rod 3. The driver 4 is provided on the periphery with the radial stop 14 which, in a defined position of driver 4 and control lever 21 with respect to each other, comes against the stop 38 of the control lever 21. The driver is provided on the side thereof facing the control lever 21 with a cylindrical opening to receive the coupling spring 13 and, diametrically to the stop 14, with a slot guide 40. By means of screws 41 passing through the latter, a wiper receiver 39 which closes the cylindrical opening of the driver 4 and has the wipers 7 is connected, the wipers resting on associated wiper paths 43 of the potentiometer 8 and adjustment of the potentiometer being established as a result of the connection of the driver 4 to the wiper receiver 39 via the screws 41 which pass through the slot guide 40. The wiper receiver 39 is finally provided, on the side thereof facing the driver 4 and the flat spiral spring 13, with two holding pins 44 between which the outer, curved end 45 of the spiral spring 13 is held while its inner end 46 passes through a groove 47 in the mounting shaft 16*a*, the latter being inserted through holes in the wiper receiver 39 and a guide plate 48 arranged between the latter and the spiral spring 13.

FIG. 2 shows, in the region of the end 16*a*" of the mounting shaft 16*a* of the throttle valve 16, the electric motor 9 which is mounted in the throttle-valve housing 24 and, via a pinion 49, drives an intermediate gear-wheel 50 which cooperates, via another pinion 51 connected to it, with a drive gear 52 which is rotatably mounted on the mounting shaft 16*a*, and when the electromagnetic clutch 10 is actuated drives the mounting shaft 16*a*.

Figure 4:
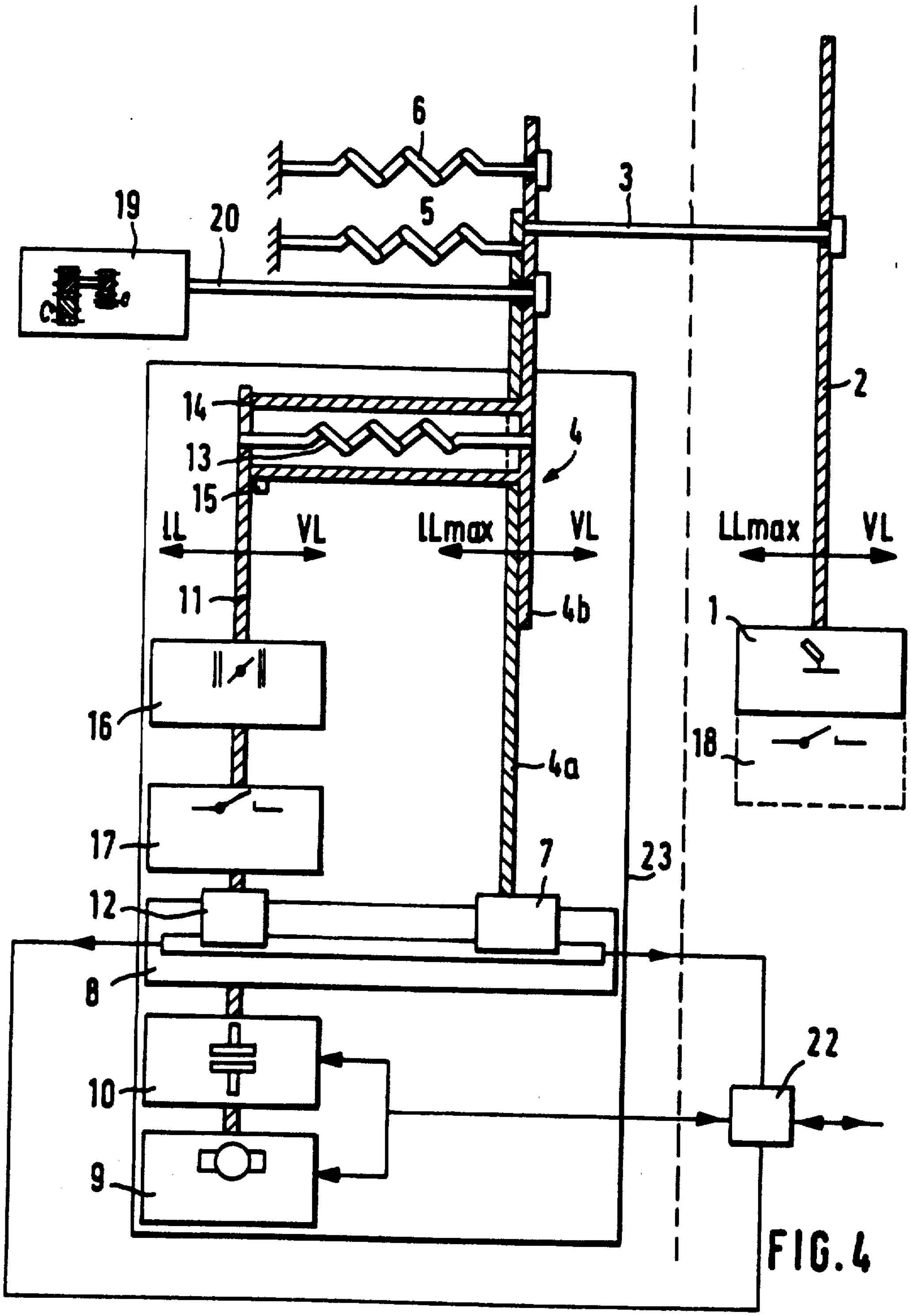
FIG. 4 is a block diagram serving to explain the basic principle of the second embodiment of the invention with a bipartite driver.

FIG. 4 shows a load-adjustment device which is substantially identical to the one shown in FIG. 1 but in which, however, the driver 4 consists of two parts 4*a* and 4*b*. Parts having the same function as in the embodiment of FIG. 1 have, as a matter of simplicity, been provided with the same reference numbers.

FIG. 4 shows the first part 4*a* of the driver 4, the return spring 5 engaging directly on said part. The part 4*a* can be shifted in the full-load direction VL via the rod 3 by means of the lever 2 associated with the accelerator pedal 1 and is connected to the wiper 7 of the potentiometer 8. The second part 4*b*of the driver 4 is movable relative to the first part 4*a* against the force of the coupling spring 13, the coupling spring 13 engaging in this connection on the control element 11 and on the second part 4*b* and attempting to pull it in idling direction against the first part 4*a*. The return of spring 6 again urges the entire driver 4 in idling direction. In the load range which is regulated down as compared with the desire of the vehicle's driver, the load-adjustment device of the embodiment in FIG. 4 operates in exactly the same manner as that shown in FIG. 1. In the upward-regulated load region, on the other hand, when the distance-monitoring device 15 is deactivated, only the second part 4*b* of the driver 4 is displaced while the first part 4*a*, which correlates with the position of the accelerator pedal 1, remains in this position. Should the control electronics fail, this has the result that the return spring 6, after the release of the clutch 10, pulls the second driver part 4*b*in idling direction back against the first driver past 4*a* until reaching the smaller load value determined by the accelerator pedal 1.

Figure 5:
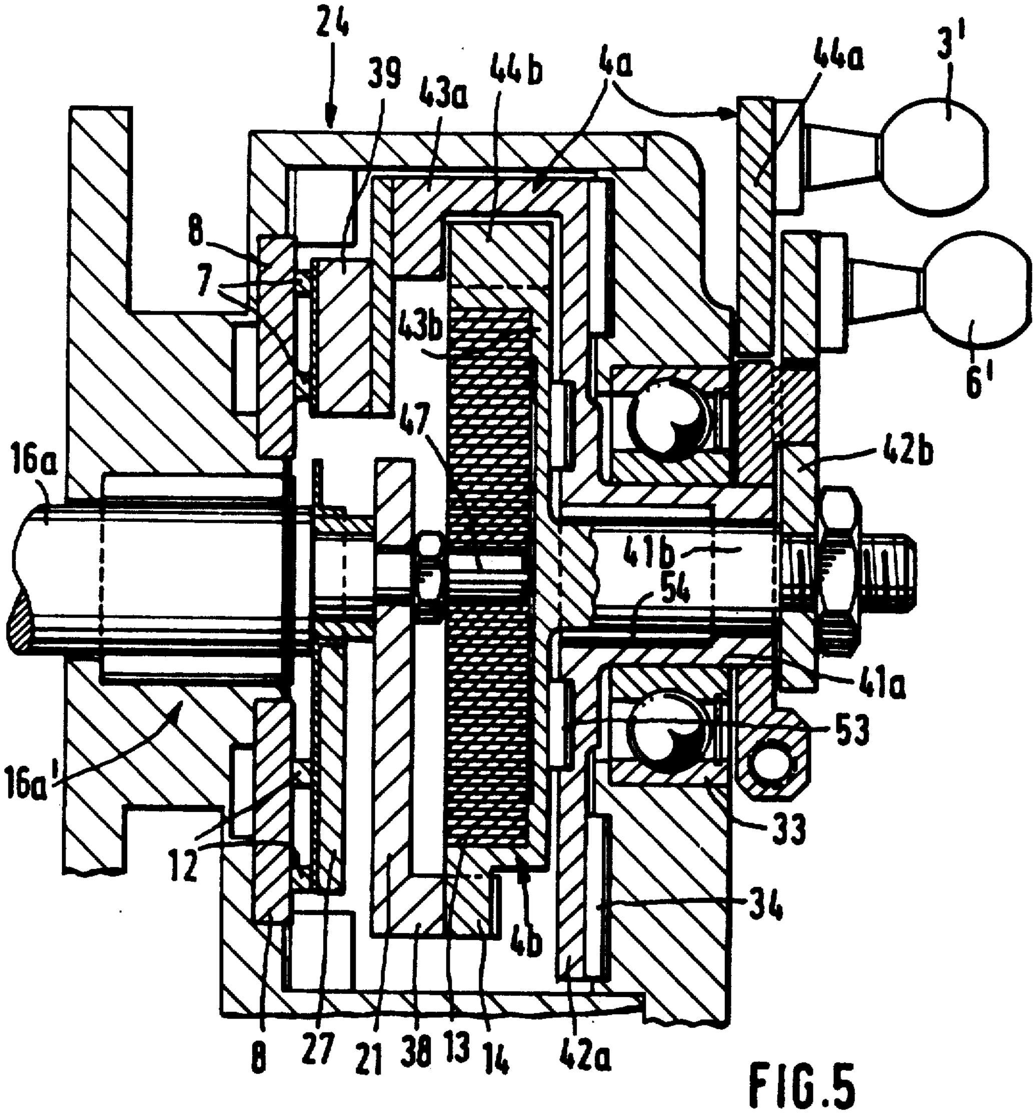
FIG. 5 is a detailed showing of the embodiment of FIG. 4 for the region of the driver-side end of the throttle-valve housing, shown in section.

FIG. 5 shows, with reference to the basic showing of FIG. 4, the corresponding development of the load-adjustment device in the region of the driver, it being based essentially on the corresponding portion of FIG. 2. Here again, as a matter of simplicity, parts agreeing in their function with the embodiment of FIGS. 1 to 3 have been provided with same reference numbers. In the throttle-valve housing 24, which is shown only in part, the shaft 16*a* for the throttle valve is first of all mounted on needle bearings, said shaft receiving the control lever 21, fixed for rotation. The wiper arm 27 is also fastened, fixed for rotation, on this shaft, its wipers 12 lying against the wiper path of the potentiometer 8 which is associated with them. A mounting hole in the throttle-valve housing 24 receives the anti-friction bearing 33, and the corresponding housing wall receives the bearing 34 in which the driver part 4*a* is mounted or rests. The latter has a sleeve region 41*a* which is arranged concentrically to the center axis of the shaft 16*a* and adjoining which, on the side facing the shaft 16*a*, there is in radial direction a circular ring region 42*a* which debouches on the outside into a sector 43*a* which extends parallel to the shaft 16*a* and has, within the region of its free end, the wiper receiver 39 with the wipers 7 which rest against the wiper path of the potentiometer 8 which is associated with them. The section of the sleeve 41*a* which extends within the region of the anti-friction bearing 33 out of the throttle-valve housing 24 receives, fixed for rotation, a lever 44*a* having a connecting nipple 3' for connection with the rod 3.

Within the sleeve region 41*a* of the driver part 4*a*, the pin 41*b* of the driver part 4*b* is rotatably mounted by means of axially and/or radially acting plane bearings 53, 54 and, in the region of its free end extending out of the throttle-valve housing 24, receives the lever 42*b* with connecting nipple 6' on which the reset spring 6 acts. The end of the pin 41*b* directed towards the shaft 16*a* debouches, at a slight distance from the shaft 16*a*, into a circular region 43*b* which terminates at the outside in an axial ring 44*b*. The flat spiral spring 33 is arranged in the ring 44*b*; it surrounds the free end of the shaft 16*a* directed towards the pin 41*b* and has its outer end attached correspondingly in the region of the driver part 4*b* surrounding it and its inner end in the slot 47 of the shaft 16*a*. The driver part 4*b* is finally provided on the outside on the ring 44*b* with the stop 14 into the path of which the shoulder 38 arranged on the control lever 21 extends.

The embodiment of the bipartite driver shown in FIG. 5 can thus be transferred directly to the embodiment of FIGS. 2 and 3 of the unipartite driver. In order to satisfy the requirements of the unipartite driver, the driver parts 4*a* and 4*b*, in the case of the bipartite driver, would merely have to be connected, fixed for rotation, with each other.

List of Reference Numbers

1 Accelerator pedal
2 Lever
3 Rod
4 Driver
4*a* Driver part
4*b* Driver part
5 Return spring
6 Reset spring
7 Wiper
8 Potentiometer
9 Setting motor
10 Clutch
11 Control element 12 Wiper
13 Coupling spring
14 Stop
15 Distance-monitoring device
16 Throttle valve
16a Mounting shaft
16a' End
16a'' End
17 Saftey contact
18 Pedal contact switch
19 Gearing
20 Automatic pull
21 Control lever
22 Electronic control device
23 Frame
24 Throttle-valve housing
25 Needle bearing
26 Bearing opening
27 Wiper arm
28 Wiper paths
30 Cable leads
31 Cable protection ring
32 Holding ring
33 Anti-friction bearing
34 Needle bearing
35 Pin
36 Lever
37 Connecting nipple
38 Shoulder
39 Wiper receiver
40 Slot guide
41 Screws
43 Wiper paths
44 Holder pin
45 Outer end
46 Inner end
47 Groove
48 Guide plate
49 Pinion
50 Intermediate gear wheel
51 Pinion
52 Driver wheel
53 Needle bearing
54 Needle bearing

We claim:

1. A load-adjustment device for admission of fuel to an internal combustion engine in response to the position of an accelerator pedal of a motor vehicle, comprising a throttle valve with housing and a control element which operates the throttle valve;

driver means including a driver inerconnecting the control element to the accelerator pedal;

an electric setting drive which moves the control element, the drive having a desired-value detection element for detecting the position of the driver, the control element having an actual-valve detection element for detecting the position of the control element;

an electronic device responsive to signals of the desired-value detection element and the actual-value detection element for controlling the electric setting drive; the improvement wherein, a) the driver, the control element, the desired-value detection element, the actual-value detection element and the setting drive are arranged in the throttle-valve housing;

b) the driver means includes a coupling spring which extends from the driver to the control element for coupling the driver and the control element; and c) the driver means includes a stop located on the driver, and the control element is urged by the coupling spring in a direction towards the stop of the driver.

2. A load-adjustment device according to claim 1, wherein the control element comprises a mounting shaft of the throttle valve and a control lever which is connected, fixed for rotation, with one end of the mounting shaft.

3. A load-adjustment device according to claim 2, further comprising an electromagnetically operating clutch; and wherein said one end of the mounting shaft of the throttle valve is connected in force-locked manner to the driver, and the opposite end of the mounting shaft is connected by the electromagnetically operating clutch top the setting drive, the setting drive comprising an electric motor.

4. A load-adjustment device according to claim 3, further comprising a reduction gearing, coupling the electric motor and the clutch.

5. A load-adjustment device according to claim 3, wherein the clutch is opened during an uncontrolled condition of the electric setting drive.

6. A load-adjustment device according to claim 2, wherein the driver is rotatably mounted in the throttle-valve housing concentric to the mounting shaft of the throttle valve.

7. A load-adjusting device according to claim 2, further comprising a potentiometer having a first wiper and a second wiper to provide a default and return report; and said desired-value detection element is developed as said first wiper, said first wiper being connected to the driver;

and the actual-value detection element comprises said second wiper, said second wiper being connected to the lever of the control element, the distance between the wipers being monitored by means of the electronic control device.

8. A load-adjustment device according to claim 1, wherein the accelerator pedal is provided with a pedal contact switch for signaling a jamming of the driver of the driver means.

9. A load-adjustment device according to claim 1, wherein the electronic control device is disconnected when the load-adjustment device is in voltage-free state.

10. A load-adjustment device according to claim 1, wherein the electric setting device is controllable as a function of at least one control variable designating an operating condition of the motor vehicle.

11. A load-adjustment device for admission of fuel to an internal combustion engine in response to the position of an accelerator pedal of a motor vehicle, comprising a throttle valve with housing and a control element which operates the throttle valve;

a driver interconnecting the control element to the accelerator pedal;

an electric setting drive which moves the control element, the control element having a desired-value detection element cooperating with the driver, the control element having an actual-value detection element which cooperates with the desired-value detection element and operates with the electric setting drive;

an electronic device responsive to signals of the desired and actual value detection elements for controlling the electric setting drive; the improvement wherein, the driver, the control element, the desired-value detection element, the actual-value detection element and the setting drive are arranged in the throttle-valve housing; the load-adjustment device further comprising a coupling spring, there being a first stop on the driver; and wherein the driver and the control element are coupled by means of the coupling spring; and the control element is urged by the spring in a direction towards the first stop of the driver; and wherein the control element comprises a mountinng shaft of the throttle valve and a control lever which is connected, fixed for rotation, with one end of the mounting shaft; and wherein the coupling spring is developed as a coil spring, and is connected at one end to the driver and at the other end to a facing end of the mounting shaft.

12. A load-adjusting devic according to claim 11, wherein the coupling spring is formed as a flat spring.

13. A load-adjustment device for admission of fuel to an internal combustion engine in response to the position of an accelerator pedal of motor vehicle, comprising a throttle valve with housing and a control element which operates the throttle valve;

a driver interconnecting the control element to the accelerator pedal;

an electric setting drive which moves the control element, the control element having a desired-value detection element cooperating with the driver, the control element having an actual-value detection element which cooperates with the desired-value detection element and operates with the electric setting drive;

an electronic device responsive to signals of the desired and actual value detection elements for controlling the electric setting drive; the improvement wherein, the driver, the control element, the desired-value detection element, the actual-value detection element and the setting drive are arranged in the throttle-valve housing; the load-adjustment device further comprising a coupling spring, there being a first stop on the driver; and wherein the driver and the control element are coupled by means of the coupling spring; and the control element is urged by the spring in a direction towards the first stop of the driver; and wherein the control element comprises a mounting shaft of the throttle valve and a control lever which is connected, fixed for rotation, with one end of the mounting shaft; and wherein the load-adjusting device further comprises a potentiometer having a first wiper and a second wiper to provide a default and return report; and wherein said desired-value detection element is developed as said first wiper and is connected to the driver;

and the actual-value detection element serves as said the second wiper and is connected to the lever of the control element, the distance between the wipers being monitored by means of the electronic control device, and wherein the driver comprises a first part which is coupled between the accelerator pedal and a wiper of the desired-value detection element; and a second part which is movable relative to the first part, there being a stop which coacts with a control lever of the control element, the second part being connected by the coupling spring to the control element.

14. A load-adjusting device according to claim 13, further comprising another spring urging the driver in the idling direction.

15. A load-adjustment device according to claim 14, wherein said another spring acts on the second part of the driver.

16. A load-adjustment device according to claim 13, further comprising a distance monitoring device arranged between the stop and the lever of the control element; and wherein the distance monitoring device, upon excess movement of said lever in following clutch movement, signals the electronic control device with a fault signal.

17. A load-adjustment device according to claim 16, wherein the electronic control device switches off the electric setting motor upon the presence of the fault signal.

18. A load-adjustment device according to claim 16, further comprising a safety contact; and wherein the distance monitoring device opens the safety contact which removes current from the clutch and thereby opens the clutch.

19. A load-adjustment device according to claim 18, wherein the safety contact has a bridging line with a switch which opens and closes upon the presence of additional control variables.

* * * * *